United States Patent
Johnsen (10) Patent No.: US 12,485,216 B2
(45) Date of Patent: Dec. 2, 2025

(54) CROSS VALVE

(71) Applicant: Carmo Holding ApS, Espergaerde (DK)

(72) Inventor: Anders Johnsen, Klagshamn (SE)

(73) Assignee: CARMO HOLDING APS, Espergærde (DK)

( * ) Notice: Subject to any disclaimer, the term of this patent is extended or adjusted under 35 U.S.C. 154(b) by 752 days.

(21) Appl. No.: 17/600,005

(22) PCT Filed: Mar. 29, 2019

(86) PCT No.: PCT/DK2019/050106
§ 371 (c)(1),
(2) Date: Sep. 29, 2021

(87) PCT Pub. No.: WO2020/200376
PCT Pub. Date: Oct. 8, 2020

(65) Prior Publication Data
US 2022/0133979 A1    May 5, 2022

(51) Int. Cl.
*A61M 1/00* (2006.01)
*B29C 45/00* (2006.01)
*B29L 31/00* (2006.01)

(52) U.S. Cl.
CPC ......... *A61M 1/743* (2021.05); *B29C 45/0017* (2013.01); *A61M 2207/00* (2013.01); *B29C 2045/002* (2013.01); *B29L 2031/7506* (2013.01)

(58) Field of Classification Search
CPC ............. A61M 1/743; A61M 2207/00; B29C 45/0017; B29C 2045/002;
(Continued)

(56) References Cited

U.S. PATENT DOCUMENTS 2,858,851 A * 11/1958 Holl ................. F16K 27/04
251/117
2,980,137 A * 4/1961 Selwood ............. F16K 11/0655
251/319
(Continued)

FOREIGN PATENT DOCUMENTS

| WO | 2004112866 A2 | 12/2004 |
| WO | 2009010331 A1 | 1/2009 |
| WO | 20180035219 A1 | 2/2018 |

OTHER PUBLICATIONS

International Search Report from related Application No. PCT/DK2019/050106, mailed Jul. 2, 2019 (4 pages).
(Continued)

*Primary Examiner* — John Bastianelli
(74) *Attorney, Agent, or Firm* — Ruggiero McAllister & McMahon LLC (57) ABSTRACT

A two-component cross valve for controlling the fluid flow through a fluid conduit, the cross valve being injection-molded in two steps with no need for assembly after the injection molding procedure. The valve comprises a valve house with a plug inside it, and it has sealing means in the form of variations in the transverse sectional area of the plug and house along their lengths. Thereby, a cross valve is obtained which does not require a viscous sealant, such as silicone, to eliminate the risk of leakage, when the valve is open.

20 Claims, 7 Drawing Sheets

(58) Field of Classification Search
CPC ......... B29C 2045/1665; B29C 45/1657; B29L 2031/7506
USPC .................. 604/249, 323, 544; 251/326–329
See application file for complete search history.

(56) References Cited

U.S. PATENT DOCUMENTS

| | | | | |
|---|---|---|---|---|
| 3,143,109 | A * | 8/1964 | Gewertz | A61B 5/150732 604/236 |
| 3,678,959 | A * | 7/1972 | Liposky | A61M 39/223 251/282 |
| 3,893,481 | A * | 7/1975 | Watts | F16K 11/078 137/636.4 |
| 4,291,706 | A * | 9/1981 | Voges | A61F 5/4405 600/580 |
| 4,306,705 | A * | 12/1981 | Svensson | A61F 5/4405 604/905 |
| 4,423,741 | A * | 1/1984 | Levy | A61B 10/007 137/625.68 |
| 4,610,666 | A * | 9/1986 | Pizzino | A61M 5/19 604/249 |
| 4,844,415 | A * | 7/1989 | Nielsen | A61F 5/4405 251/96 |
| 5,466,216 | A * | 11/1995 | Brown | A61M 1/3613 604/249 |
| 6,086,762 | A | 7/2000 | Guala | |
| 6,913,244 | B1 * | 7/2005 | Atkinson | F16K 1/123 251/343 |
| 7,520,489 | B2 | 4/2009 | Ruschke | |
| 7,828,269 | B2 * | 11/2010 | Iversen | F16K 3/262 604/323 |
| 8,038,123 | B2 | 10/2011 | Ruschke et al. | |
| 8,118,060 | B2 | 2/2012 | Stallmann | |
| 8,240,335 | B1 * | 8/2012 | Broberg | F16K 11/0716 137/625.48 |
| 2006/0163515 | A1 | 7/2006 | Ruschke | |
| 2009/0020718 | A1 | 1/2009 | Stallmann | |
| 2009/0030379 | A1 * | 1/2009 | Burgess | A61M 39/22 604/249 |
| 2009/0184275 | A1 | 7/2009 | Ruschke et al. | |
| 2010/0286650 | A1 * | 11/2010 | Fitzgerald | A61J 1/1412 604/249 |
| 2011/0106060 | A1 * | 5/2011 | Atkinson | F16K 27/041 251/324 |
| 2020/0397532 | A1 | 12/2020 | Bushman | |

OTHER PUBLICATIONS

Written Opinion from related Application No. PCT/DK2019/050106, mailed Jul. 2, 2019 (6 pages).
Written Opinion from related Application No. PCT/DK2019/050106, mailed Jun. 10, 2020 (5 pages).
International Preliminary Report on Patentability from related Application No. PCT/DK2019/050106, completed on Jul. 5, 2021 (5 pages).
https://www.nordson.com/en/products/industrial-coating-systems-products/2k-dispensing-valve.
https://www.graco.com/us/en/in-plant-manufacturing/products/sealants-adhesives/sealant-applicators-dispense-valves/md2---two-component-mixing-dispense-valve.html.
https://eco-plast.it/en/plastics-molding/two-component-moulding/.
https://revpart.com/two-component-injection-molding-process/.
https://en.wikipedia.org/wiki/Multi-material_injection_molding.
https://backend.orbit.dtu.dk/ws/portalfiles/portal/4510854/SPE.

* cited by examiner

CROSS VALVE

1. FIELD OF THE INVENTION

The invention relates to the field of fluid valves. Specifically, it relates to manually controlled mechanical valves for blocking or releasing flow of a fluid through a conduit.

2. BACKGROUND

Valves are used in many contexts, where there is a need for controlled draining a fluid from a container.

Such a valve may for example see frequent use when installed in the outlet of a urine bag as may be used by persons suffering from urinary incontinence or by disabled individuals for whom cauterization is the way of urinating, and who require a means for intermittently empty such a urine bag.

For such use it is, naturally, necessary that the valve is sealed when it is closed. Likewise, it is important that when it is open, the fluid only drains through the outlet of the valve without any leakage to the sides.

It is challenging to avoid leaking, when the valve is open, if the valve is made up of two components. One method used in the art to ensure that the valve is sealed is to coat the contact surfaces of the valve with silicone. The silicone provides an efficient seal against leakage, but it is a costly procedure to assemble the two components of such a valve with such a coating.

One way to overcome these challenges is to produce the valve as a single component. This alleviates the issue of ensuring the necessary seal between said components. Meanwhile, to release a fluid from a one-component valve, it is often necessary to apply pressure to the valve continuously during the draining of the connected container. This is cumbersome and especially problematic for users suffering from a disability which may be the reason why they need the valve in the first place.

WO 2018/035219 A1 teaches a valve assembly molded as two separate components and subsequently assembled. The assembly has a house and a plug, the plug can be rotated within the house to open or close the valve assembly allowing a flow of a fluid. The house and plug each comprise a lip or a ridge that engage each other when the valve is assembled. The engaging lip and ridge are made as rings around the surface of the house and plug, respectively. The engaging lip and ridge help seal the valve by remaining engaged when the plug is rotated within the house.

U.S. Pat. No. 6,086,762 A discloses a transducer-protector device connectable to a Luer Lock on one side and comprising a coaxial connection on the other. The first and second tubular connectors of the transducer-protector comprise radial annular flanges that allow the first and second tubular connectors to be connected to each other in a permanent and sealed fashion by assembly followed by ultrasonic welding. A filtering membrane is interposed and clamped between the annular flanges. The second tubular connector is formed in a rigid thermoplastic material and the first annular flange is molded in a more elastic thermoplastic material. Further, it is taught to make use of the varying cooling rate and shrinkage of sections of a part molded with varying wall-thickness.

US 2006/163515 A1 teaches a piston valve for controlling the flow of liquid through a needle free fluid handling device. The house and the piston are molded separately through a two-shot molding process. The house may be created using over molding where the two parts of the house a molded together and treated as a single unit, so that only the house and the piston must be assembled after the molding.

3. SUMMARY

It is the aim of the current invention to alleviate at least some of the above-mentioned problems. This is achieved by producing a two-component cross valve which is injection-molded in two steps with no need for assembly after the injection molding procedure. This two-component cross valve for controlling the fluid flow through said cross valve comprises:

A valve house, said valve house comprising a fluid inlet, a body, and a fluid outlet;
 a plug, said plug comprising a wall and an opening channel, and;
 said plug being placed inside the body of said valve house;
 wherein said two-component cross valve comprises sealing means in the form of variations in the transverse sectional area of said plug along the length of said plug.

The two-component cross valve (in the art sometimes referred to as T-taps) is a known valve construction, but previously it has not been possible to construct it so that it does not require a viscous sealant, such as silicone, to eliminate the risk of leakage when the valve is open. However, incorporating changes in the transverse sectional area of the plug provides a sealing mechanism allowing the omission of a viscous sealant.

The variation in the transverse sectional area of the plug can take different forms. For example, it can be a local change in a small strip, or it can be a more gradual change across a length of the plug.

The cross valve is designed to control the flow of a fluid through the valve itself. By a fluid is understood either a liquid or a gas.

In an embodiment of the invention, the variations in the transverse sectional area of said plug take the form of local increases in said area, where the plug comprises one or more sealing grooves.

Such sealing grooves may take many shapes. For example, they may be either rounded or have steeper sidewalls. They may have varying width, and also the number of said sealing grooves may differ between embodiments of the invention. The sealing grooves will be shaped such that they match a sealing lip in the valve house of the cross valve, whereby said sealing groove and said sealing lip can interlock. Thus, the sealing grooves offer a change in the direction of the material, whereby it extends across any clearance that may appear between the plug and the valve house and which may cause leakage through the top or bottom of the body of the valve house. The interlocking sealing groove and sealing lip become a strong sealing point of the cross valve and can be made directly in the same materials from which the plug and valve house, respectively, are injection-molded.

In another embodiment of the two-component cross valve, the variations in the transverse sectional area of said plug take the form of local decreases in said area, where the plug comprises one or more sealing lips.

Like the sealing grooves, the sealing lips may take many shapes. For example, they may have either rounded or have steeper sidewalls. Also, the sealing lips may have varying width, and the number of said sealing lips can also differ between embodiments of the invention. The sealing lips will be shaped such that they match a sealing groove in the valve house of the cross valve, whereby said sealing groove and said sealing lip can interlock. Thus, the sealing grooves offer a change in the direction of the material, whereby it extends across any clearance that may appear between the plug and the valve house and which may cause leakage through the top or bottom of the body of the valve house.

The interlocking sealing lip and sealing groove create strong sealing points of the structure and can be made directly in the same materials from which the plug and valve house, respectively, are injection-molded.

The sealing lips and sealing grooves are capable of supplying a seal while being small enough to cause such little resistance that it will still be easy for a user to change the position of the plug within the valve house to open or close the cross valve. Thus, these interlocking seals provide enough resistance for the plug to be kept in place, when the user moves around, whereby the risk of unintentional opening is diminished. They can also provide the user with a tactile feedback of the valve being in the open or closed position. Furthermore, it is possible to obtain these effects while keeping said sealing lips and sealing grooves small enough to prevent that the movement of the plug within the valve house requires great finger strength which may be important for elderly or disabled users.

In an embodiment of the invention, the variations in the transverse sectional area take the form of one or more increases along the longitudinal direction of a section of said plug in addition to any area changes brought on by said sealing lips or said sealing grooves.

An increase of the transverse sectional area, such as a conical shape, does also contribute to the sealing of the cross valve. A stronger seal is achieved, if the plug is shaped so that it expands, moving it so that the wider region of the plug forces the sides of said plug more strongly against the inside of the body of the valve house.

The expansion of the transverse sectional area may extend along the entire length of the plug. Alternatively, the transverse sectional area may extend along one or more sections of the length of the plug, e.g. half or a quarter of the length. Similarly, it would be possible to have two separate sections of the plug comprise an increase of the transverse sectional area. Furthermore, such sections may be designed to comprise an increase in the transverse sectional area in directions opposing each other.

In an embodiment of the invention, the cross valve comprises an oval transverse sectional geometry of said plug. The inside of the valve body will have a matching oval cross section while the outside of the body may have any shape, e.g., it can comprise slight indents to provide a better grip for the user or have another shape for purely aesthetical reasons without it influencing the inside geometry of the valve body or the benefits thereof.

To ease the use of the cross valve it is necessary to avoid that the plug can rotate within the body of the valve house. Rotation of the plug might cause the opening channel within the plug to be misaligned with the fluid inlet and fluid outlet of the valve house. This can decrease the flow of the fluid through the valve or even cause it to be blocked entirely even when the cross valve is configured to be open.

In the art, it is common to use a plug having a circular base geometry and provide it with a single flat side to hinder any rotation. However, said flat side becomes a region with an increased risk of leaking.

The oval transverse sectional geometry obstructs rotation of the plug within the valve house without introducing any sharp edges or flat surfaces that may comprise an increased risk of leaking.

The ovality of the body 130 of the valve house 110 is such that the longer axis is perpendicular to the fluid flow through the cross valve 100. This geometry increases the sealing effect of the cross valve as it decreases the curvature at the openings to the fluid input and fluid output, whereby said openings are blocked by the plug more thoroughly. A fluid is most likely to leak into a clearance space between the valve house and plug at the point of highest curvature.

Increasing the transverse sectional area of the plug and valve body would also decrease the curvature of the plug at the opening of the fluid inlet, but that would increase the overall size of the cross valve too. The oval transverse section provides the benefits of a lower curvature while maintaining a small footprint for the cross valve.

In the particular context, where the cross valve is connected to a urine bag, it is especially important that said cross valve is small and discreet as well as easy to operate. Being able to have the bag placed on the body of the user in an unobtrusive manner, where it can be easily kept out of view, e.g. under clothes, is important for users to not feel exposed. This is only achievable if the cross valve is compact.

In a preferred embodiment of the invention, the long axis of the oval transversal section is between 1.01 and 1.3 times longer than the short axis.

In a more preferred embodiment of the invention, the long axis of the oval transversal section is between 1.03 and 1.06 time longer than the short axis.

In an embodiment of the invention, said plug comprises two flanges placed on either side of said body of said valve house. Preferably, the flanges are placed at either end of the plug.

If a cross valve is produced in two components, which have to be assembled subsequently, it is not possible to have more than one flange injection-molded into the plug as it would stop said plug from entering the valve house.

Having two flanges on the plug presents several benefits. Firstly, the flanges prevent the plug from coming loose from the valve house. If it is possible for the plug to come free entirely, it may be dropped. If it is dropped, the plug may be lost and even if it is not, reinserting it into the valve house could cause a hygienic risk. Additionally, a seal relying on a viscous sealant may become less efficient if the plug is removed entirely and come into contact with unfavorable external environments.

Secondly, the flanges prevent the user from pressing the plug further through the vale house than intended. If the plug were pushed too far, it would cause the fluid flow through the opening channel in the plug to be blocked partially. Furthermore, the cross valve is designed to ensure that the system is leak-tight in the open position. Sealing features, e.g., sealing lips, can be placed more favorably when knowing the exact open position of the cross valve. When using such sealing means, pushing the plug too far through the valve house would increase the risk of leakage.

Thirdly, the flanges provide the user with a larger area for applying pressure when opening or closing the cross valve. In turn, this means that the counter-pressure is delivered to a larger area of the user. This means that the user will experience a smaller force per area on themselves thus leading to a decreased risk of tissue damage or pain.

If the example of the cross valve being used for draining a urine bag is used again, said drainage may need to take place in crammed spaces, e.g., airplane bathrooms, which makes it important that the mechanism for opening and closing the cross valve is simple to operate. Furthermore, a significant number of the users are disabled and have decreased mobility skills, and easy use requiring a minimum of finger strength as well as having no sharp edges therefore becomes very important.

Further, the invention covers a method for creating a two-component cross valve comprising:

Injection molding one component followed by die-casting of the other component either in the form of inner molding or over molding, whereby the first component takes part in shaping the second component;

wherein the shrinking of the components after molding during the cooling of the materials is utilized to improve the seal of said cross valve.

Injection molding is a known method in the art of producing various components. The same is the case for inner molding and over molding. However, the method has not previously been used for production of two-component cross valves as it has not been possible to keep such valves leak-tight without the addition of a viscous sealant.

Injection molding the first and second components of the two-component cross valve directly into each other as done with inner or over molding has the benefit of the cross valve being assembled during the casting procedure with no extra steps involved. This leads to a significant decrease in production costs as an assembly machine or person can be foregone.

Obtaining a leak-tight cross valve through injection molding with inner or outer molding is possible because of the sealing lips and sealing grooves as well as the expanding regions along the plug. The shrinking of the injection-molded material has been accounted for in the design of the produced parts and play an integral part in ensuring that the final product is indeed sealed.

In an embodiment of the invention, said first component to be injection-molded is said valve house, and the plug is injection-molded inside said valve house using said valve house as a mold, whereby the method is inner molding.

Inner molding of the two-component cross valve leads to the plug shrinking away from the valve house during cooling. In this case, the shrinkage lessens the pressure along the length of the plug and the valve house, whereby the force necessary to move the plug is minimized while still keeping the cross valve leak-tight.

In an embodiment of the invention, said first component to be injection-molded is said plug, and said valve house is injection-molded around said plug by way of over molding.

Over molding of the two-component cross valve leads to the valve house shrinking inwards around the plug. This shrinkage means an increased force between the inside of the valve house and the outside of the plug, whereby risk of leakage is decreased.

In an embodiment of the invention, the method for creating a two-component cross valve involves that the second component is molded in such a way that a part of the first component functions as a stop which restricts the direction in which the material of said second component can shrink during cooling.

If there is no outer influence on an injection-molded component, it will shrink towards its center as it cools and hardens. However, this limits the ways in which a second component to be molded based on a first component can be designed as it will always be skewed in a specific manner with regard to the first part. By molding the components in such a way that part of the first component, which functions as a mold for the second component, is in contact with the second component on a significant surface, the direction in which the second component shrinks can be controlled. This enables the possibility of different designs as compared to the second component being able to shrink only towards the middle.

4. BRIEF DESCRIPTION OF THE DRAWINGS

In the following, example embodiments are described according to the invention, where.

5. DETAILED DESCRIPTION

In the following, the invention is described in detail through embodiments thereof that should not be thought of as limiting to the scope of the invention.

Figure 1:
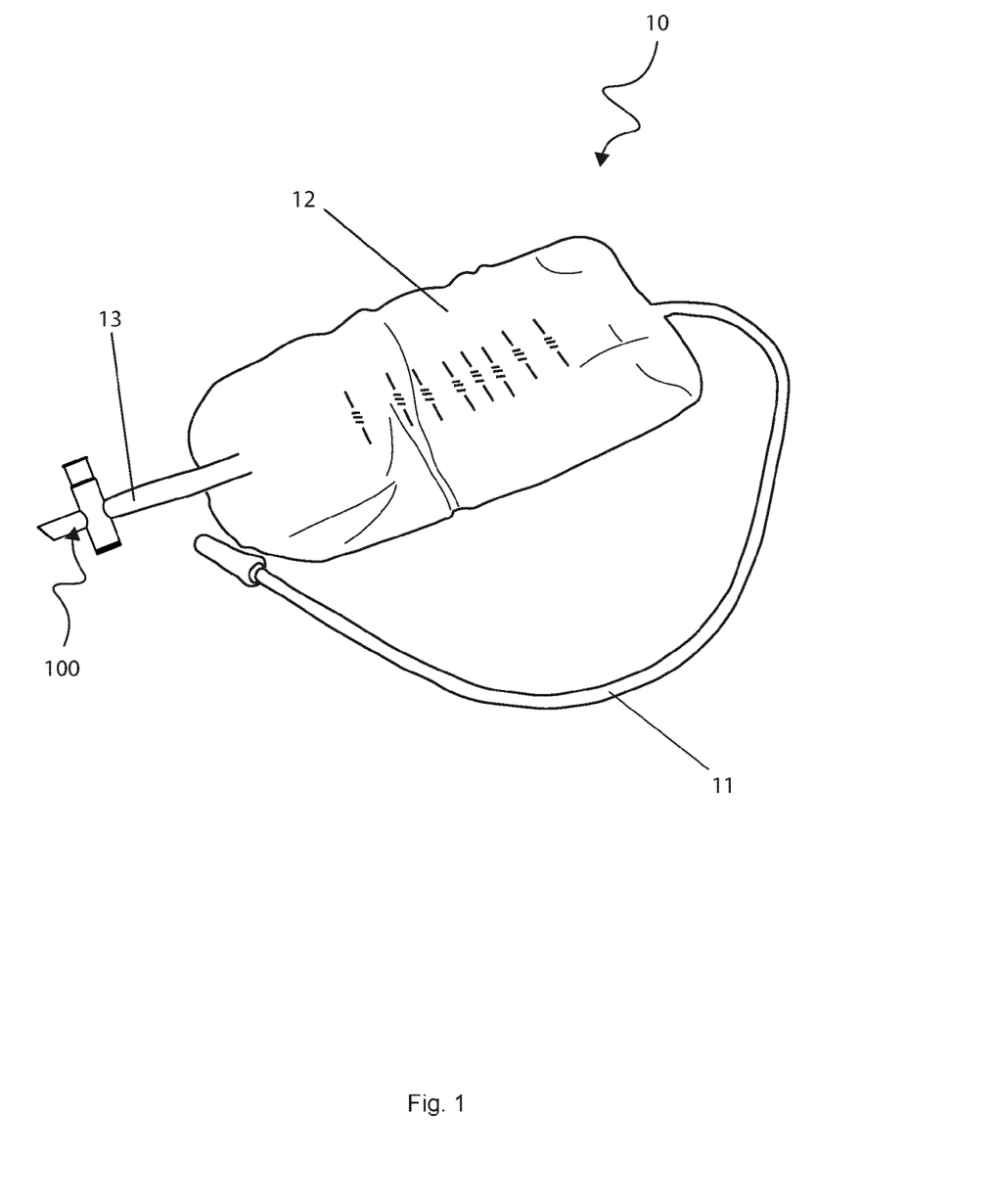
FIG. 1 is a urine bag with a cross valve connected to an outlet tube.

FIG. 1 is a sketch of urine bag 10 with a cross valve 100 connected to an outlet tube 13. This is a common use of the cross valve 100, but it may be connected to many other fluid systems, where a leak-tight valve is useful for controlled releasing of the fluid from a container.

In the case of a urine bag 10, it is common to have an inlet tube 11 which can be connected to a catheter (not shown). The inlet tube 11 allows fluid to flow into the bag 12, where it will accumulate as long as the cross valve 100 is closed. The cross valve 100 is placed in an outlet tube 13. Once the user would like to drain the contents of the bag 12, the cross valve 100 can be opened and the fluid drained.

Figure 2:
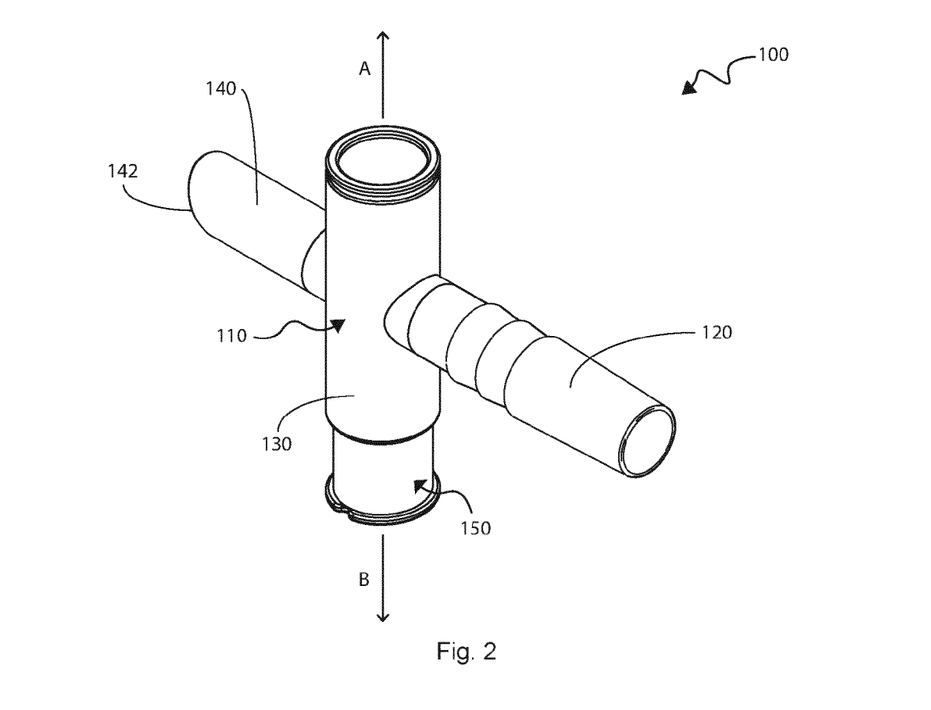
FIG. 2 is a cross valve according to the invention shown in perspective.

FIG. 2 shows a cross valve 100 according to the invention. The cross valve 100 comprises a valve house 110 and a plug 150.

The valve house 110 comprises a fluid inlet 120 which can take many different shapes depending on the system to which it is to be connected. Thus, the function of the fluid inlet 120 is to allow connection of the cross valve 100 to the fluid container 10 (not shown) from which it is to block or release a fluid.

The valve house 110 further comprises a fluid outlet 140. The fluid outlet 140 can also take various forms. In a preferred embodiment, the fluid outlet 140 is long enough to allow the user to rest a finger under it without having any of the fluid spill onto said finger. Furthermore, in a preferred embodiment of the invention, the opening 142 of the fluid outlet 140 is angled to improve the user control of the fluid flow.

The body 130 of the valve house 110 encircles a plug 150. Said plug 150 can be moved up or down within the valve house 100 (illustrated by the arrows A and B, respectively) to open or close the fluid flow through the cross valve 100. In different embodiments of the invention, it may be reversed which direction of movement of the plug 150 causes opening and closing, respectively, of the cross valve 100.

In a preferred embodiment of the invention, both components of the two-component cross valve 100 is produced from one or more materials that can be injection-molded, e.g., plastic. In some embodiments, both of the components of the two-component cross valve 100 may be produced form the same material. In other aspects of the invention, they are produced from different materials. Similarly, the invention is not restricted to have all parts of either the valve house 110 or the plug 150 be made of the same material.

Figure 3:
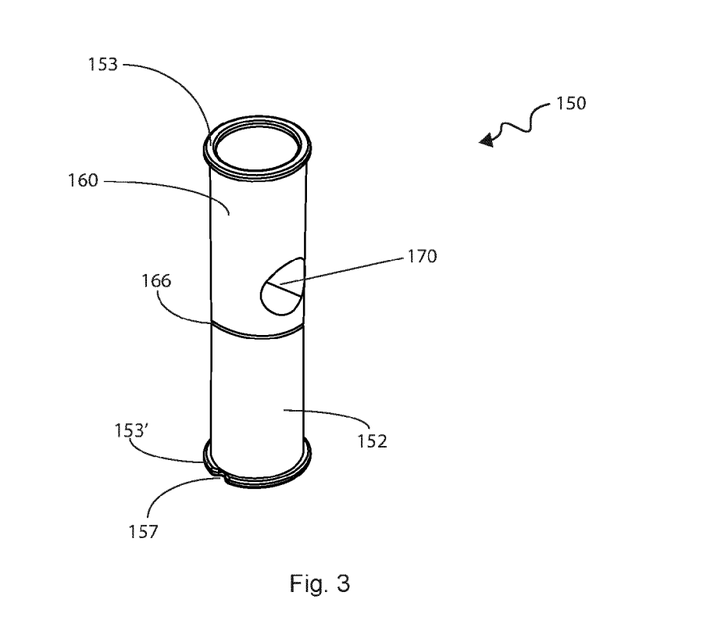
FIG. 3 is a plug of the cross valve according to one variant of the invention shown in perspective.

FIG. 3 shows the plug 150 of the cross valve alone without the surrounding valve house 110. The plug 150 comprises a tube 152 with a thoroughgoing opening channel 170. When the cross valve 100 is open, the opening channel 170 is positioned such that it is at least partially in line with the fluid inlet 120 (not shown) and fluid outlet 140 (not shown) of the valve house 110 (not shown) such that the fluid may pass from said fluid inlet 120 through the opening channel 170 to said fluid outlet 140.

The cross-sectional area of the opening channel 170 may vary for different embodiments of the invention. In a preferred variant, the cross-sectional area is similar to that of the respective inner openings of the fluid inlet 124 and the fluid outlet 144, but in other embodiments of the invention the cross-sectional area of the opening channel 170 can be either smaller or larger than that.

The plug 150 itself can be hollow aside from the sidewalls of the opening channel 170 to decrease the weight of the cross valve 100. In another embodiment of the invention, the plug 150 needs not be hollow. The plug 150 may be solid or partially hollow with stabilizing structures inside.

In a preferred embodiment of the invention, the plug 150 is equipped with two flanges 153, 153' placed at either end of the plug 150. These flanges 153, 153' provide the user with a bigger area to apply pressure to when changing the position of the cross valve which in turn increases the area of the finger of the user who receives a corresponding counter-pressure, whereby the risk of pain or physical damage is reduced. Furthermore, the flanges 153, 153' prevent the plug from being pressed further through the valve house than intended. Thus, the flanges 153, 153' help guide the open and closed positions of the cross valve thus allowing more efficient design of the sealing elements of the cross valve as they may match the positions specifically.

The flanges 153, 153' may be rings at the edge of the plug 150 as shown in FIG. 3, or they may take different geometries, e.g., a full plate at the ends of the plug 150 or rounded surfaces on said ends.

Furthermore, the flanges 153, 153' function as stops for the plug 150 thus lessening the risk of the plug 150 being released from the valve house 110 and being dropped.

One of the flanges 153 may be equipped with a tactile marker 157 to help visually impaired users determine which end needs to be pressed to open or close the cross valve 100. Such a tactile marker 157 may take the form of a small indent as shown in the example of FIG. 3. Alternatively, the tactile marker 157 may be a small protrusion on the flange 153. It is also foreseen that such a tactile marker 157 may take the form of a first flange 153 being of a different material than a second flange 153'.

The plug 150 may comprise one or more sections, wherein the transverse sectional area of said plug 150 changes along the length of the plug. This may for example be achieved by increasing the thickness of the wall 160 of the plug 150 along the section. Said section may include the entire length of the plug 150.

In some embodiments, the wall 160 of the plug 150 may comprise one or more sealing lips 165, sealing grooves 166 or a combination of both.

Figure 4A:
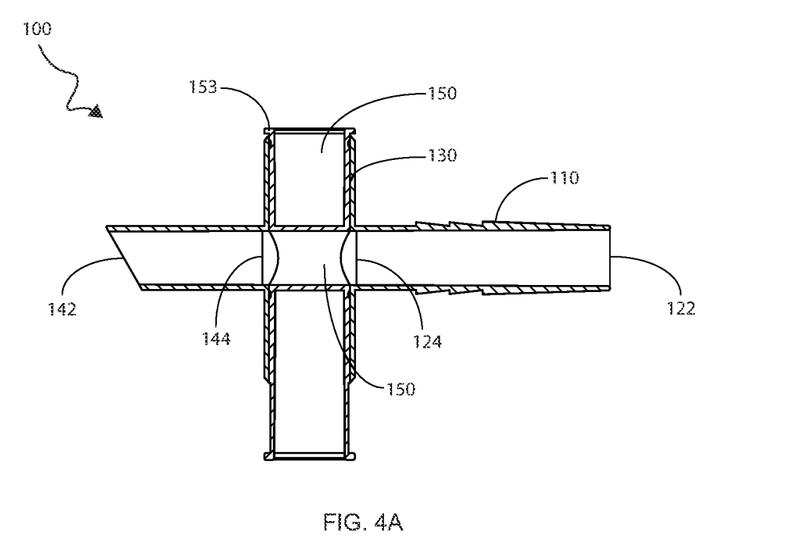
FIG. 4A is a cross-sectional view of an open cross valve according to the invention.

FIG. 4A shows a cross-sectional view of an open cross valve 100 according to the invention. The plug 150 has been pressed until the body 130 of the valve house 110 stops the flange 153. In the shown position, the opening channel 170 is aligned with the inner openings of the fluid inlet 124 and the fluid outlet 144, respectively, whereby a fluid flow through the cross valve 100 is enabled. In this situation, a fluid enters the cross valve 100 at the outer opening of the fluid inlet 122, traverses the cross valve 100 through the opening channel 170, and exits the valve through the outer fluid opening of the outlet 142.

It is foreseen that other embodiments of the invention may have a separate stop on the plug 150 whereby the cross valve 100 is opened in a different position than the one shown in FIG. 4A, where the flange 153 is in contact with the valve house 110.

Figure 4B:
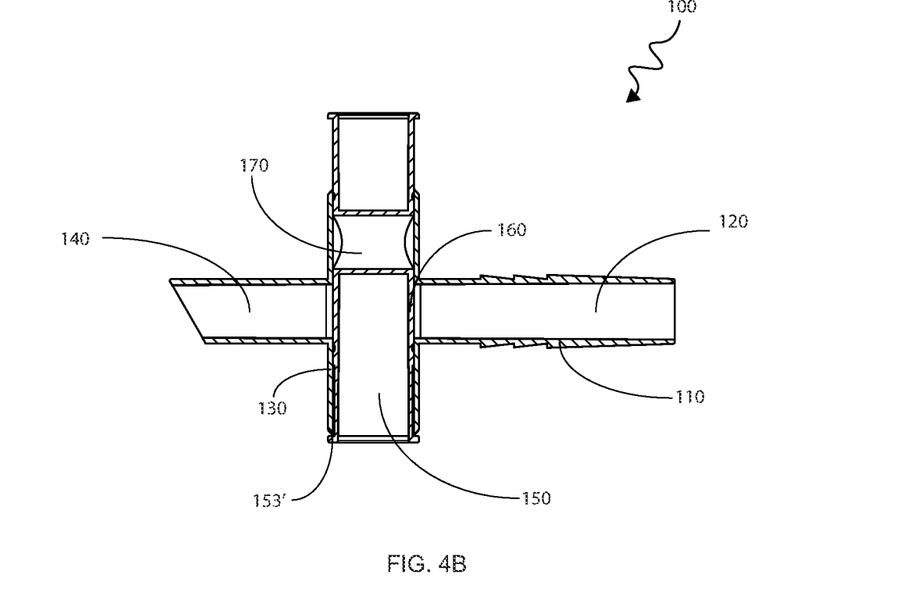
FIG. 4B is a cross-sectional view of a closed cross valve according to the invention.

FIG. 4B shows a cross-sectional view of a closed cross valve 100 according to the invention. The plug 150 has been pressed until the body 130 of the valve house 110 stops the flange 153'. In the shown position, the fluid inlet 120 and the fluid outlet 140 are blocked by the wall 160 of the plug 150, whereby a fluid flow through the cross valve 100 is hindered.

Although shown as having the flange 153' in contact with the valve house 110, it is apparent that the cross valve 100 is closed before this position. Thus, the extreme position, where the flange 153' is in contact with the valve house 110, is not the only intended realization of a closed cross valve 100 in accordance with the invention.

Figure 5:
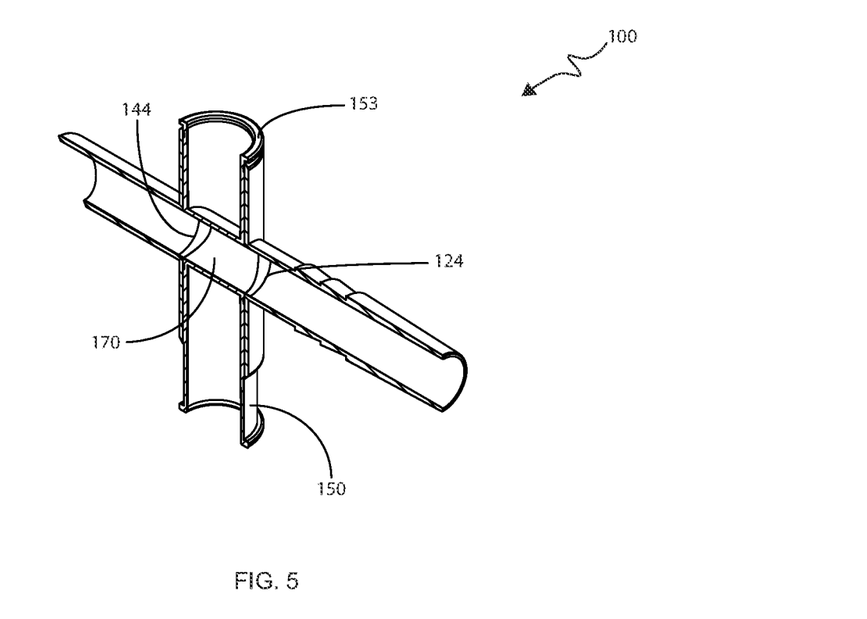
FIG. 5 is a cross-sectional view of an open cross valve according to the invention shown in perspective.

FIG. 5 is a cross-sectional view of an open cross valve according to the invention shown in perspective. This view supplements FIG. 4A by revealing the shape of the opening channel 170 in the plug 150 thus making it more apparent how opening the cross valve 100 allows the fluid flow.

Figure 6:
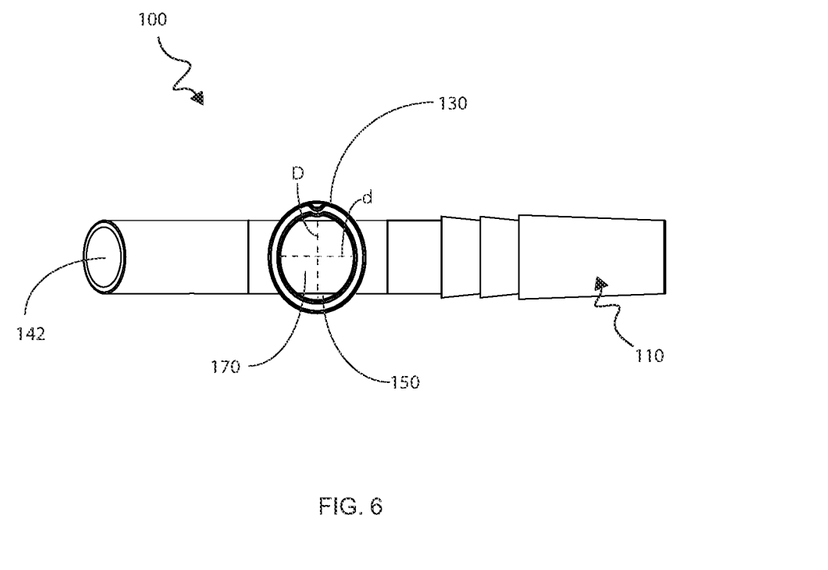
FIG. 6 is a cross valve according to the invention shown in a top view.

FIG. 6 is a cross valve 100 according to the invention shown in a top view. From this angle, it is more clearly visible that the opening of the fluid outlet 142 is angled. Furthermore, viewing the cross valve from this angle shows that the transverse sectional area of the body 130 of the valve house 110 as well as the plug 150 are slightly oval. Dashed lines d, D are added as a guide for the eye to accentuate the difference in length of the two axes, the oval shape arising from D being longer than d. In different embodiments of the invention, the difference between the axes of the transverse section may differ to make the ovality more or less pronounced. In a preferred embodiment, the ratio of the long axis (D) to the short axis (d) is between 1.01 and 1.3. In an even more preferred embodiment of the invention, the long axis (D) is between 1.03 and 1.06 times larger than the short axis (d).

The oval shape of the plug 150 ensures that it cannot rotate within the valve body 110. Thus, there is no risk of the plug being in the position where the cross valve 100 is to be open but where the opening channel 170 has rotated away from the inner openings of the fluid inlet 124 and the fluid outlet 144 (neither seen in this angle), whereby the fluid flow would still be blocked.

In a preferred embodiment of the invention, the orientation of the oval is such that the longer sides face the fluid inlet 120 and the fluid outlet 140. This configuration helps ensure the sealing of the opening channel 170 in the closed state of the cross valve 150. The curvature of the body 130 and plug 150 needs to be exactly matched to ensure that the fluid cannot get access to a potential clearance space between said plug 150 and said body 130. Having the flatter side of the oval geometry face the fluid inlet 120 allows a less curved region to create the seal between the valve house 110 and the plug 150.

Figure 7A:
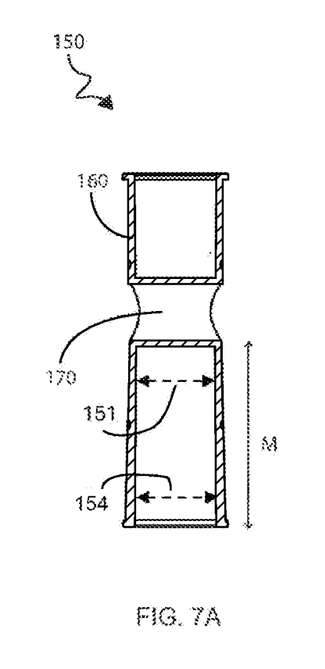
FIGS. 7A-C show a cross section of the plug in two different variants according to the invention.
Figure 7B:
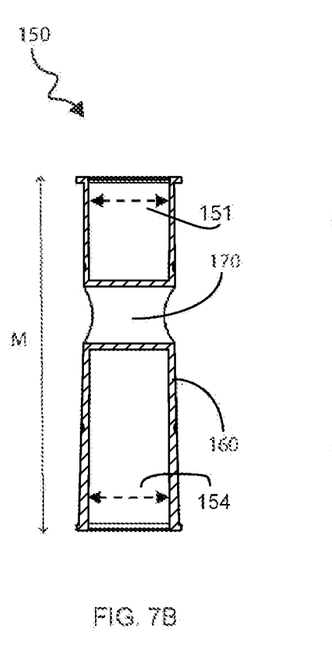

FIG. 7A and FIG. 7B show longitudinal sections of the plug 150 in two different variants according to the invention. The figures illustrate how the area of the transverse section is increased along a longitudinal section (marked by arrow M) of the plug 150. In FIG. 7A, the section, where the transverse sectional area is increased, extends from a first end of the plug 150 to the opening channel 170. In FIG. 7B, the section where the transverse sectional area is increased, extends along the entire length of the plug 150. These two variations are only examples of the structure. For example, the area of transverse section 154 is greater than the area of transverse section 151. Embodiments, where the expanding region extends along any other fraction of the length of the plug 150, are foreseen. Similarly, the amount of increase in the transverse sectional area may differ between embodiments.

Figure 7C:
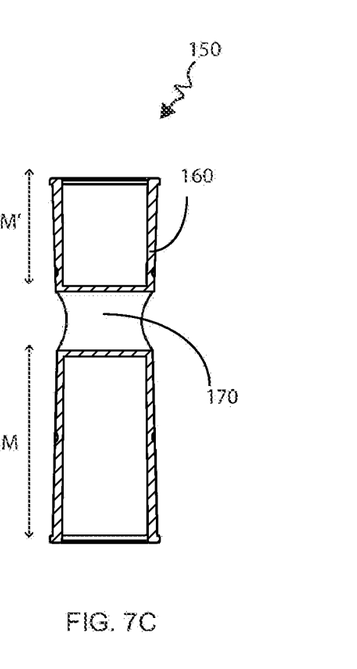

FIG. 7C shows that the plug 150 can sustain multiple sections M, M' within which the transverse sectional area is increased in accordance within the invention. The amount of increase in the transverse sectional area along a section M, M' may be the same but is not restricted to be identical within an embodiment just as they may vary between embodiments of the invention.

The increase in the transverse sectional area contributes to the sealing of the cross valve 100, when it is in the closed state. When the plug 150 is moved thus bringing the cross valve 100 from the open to the closed state, the increase in the transverse sectional area of the plug 150 causes the walls 160 of the plug 150 to press increasingly more against the inside of the body 130 of the valve house 110, whereby the strength of the seal is enhanced.

As the two-component cross valve is created through inner molding or over molding, the shapes of the plug 150 and the valve house 110 (not shown) will follow each other. Thus, they will exhibit corresponding increases in the transverse sectional area, and both components contribute to the effect.

Figure 8:
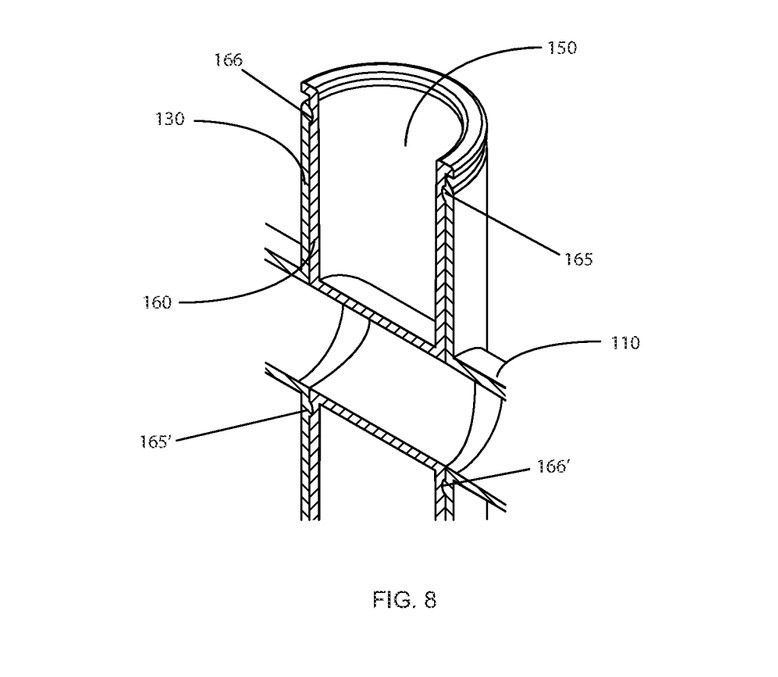
FIG. 8 shows sealing lips in a cross-sectional close-up according to one variant of the invention.

FIG. 8 shows a set of sealing lips 165, 165' in the body 130 of the valve house 110 and corresponding sealing grooves 166, 166' in the wall 160 of the plug 150 in a longitudinal sectional close-up according to one variant of the invention. The sealing lips 165, 165' and sealing grooves 166, 166' interlock, whereby a strong seal is achieved. Even if some of the fluid enters a clearance space between the body 130 of the valve house 110 and the plug 150, the sealing lips 165, 165' will create a block for the fluid.

FIGS. 9A-D sketch different embodiments of sealing lips 165 or sealing grooves 166 on the inside of the body 130 of the valve house 110. The number of sealing lips 165 or sealing grooves 166 as well as their geometry and placement are varied between different embodiments.

Figure 9A:
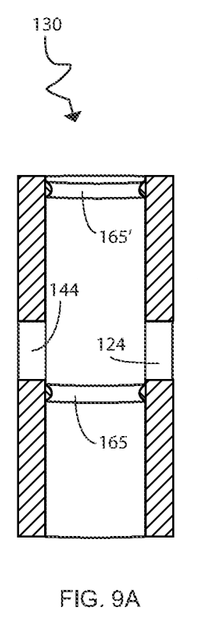
FIGS. 9A-D are sketches of different variants of sealing lip placement, number, and shape.

FIG. 9A shows two sealing lips 165, 165' protruding from the inside of the body 130 of the valve house 110 and placed on either side of the inner openings of the fluid inlet 124 and the fluid outlet 144. A first sealing lip 165 is placed in close proximity to the inner openings of the fluid inlet 124 and the fluid outlet 144, while a second sealing lip 165' is located close to the end of the body 130 of the valve house 110.

Figure 9B:
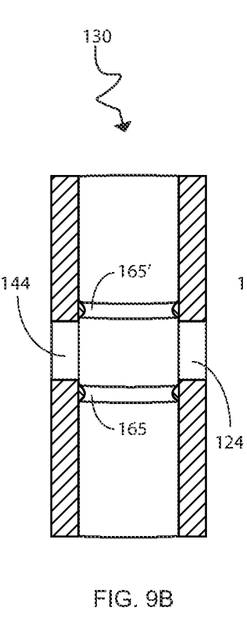

FIG. 9B shows two sealing lips 165, 165' placed on either side of the inner openings of the fluid inlet 124 and the fluid outlet 144, respectively. Both of the sealing lips 165, 165' are placed in close proximity to the inner openings 124, 144.

FIGS. 9A-B are two examples of placements of pairs of sealing lips 165, 165'. Many other constellations, where different numbers of sealing lips 165, 165' are placed at other positions along the body 130 of the valve house 110, may be used within the scope of the invention.

For example, the cross valve 100 can comprise sealing lips 165, 165' and sealing grooves 166, 166' distributed on the inside of the body 130 and the outside wall 160 of the plug 150 in such a manner that they interlock in different constellations, when the cross valve 100 is open and closed, respectively. For example, a first sealing lip 165 may be interlocked with a first sealing groove 166, when the cross valve 100 is closed. When the cross valve 100 is in the preferred open position, the first sealing lip 165 will interlock with a second sealing groove 166' instead.

Figure 9C:
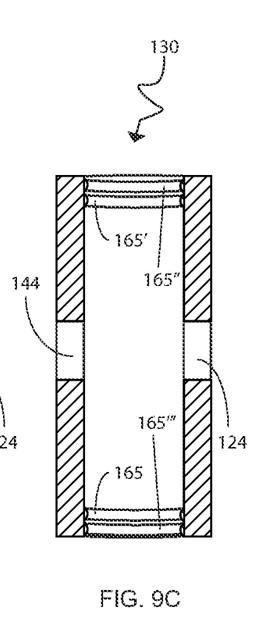

FIG. 9C shows four sealing lips 165, 165', 165", 165''' placed in two pairs close to each other. A first pair of sealing lips 165, 165' is placed near a first end of the body 130 of the valve house 110, while a second pair of sealing lip 165", 165''' is located close to a second end of the body 130 of the valve house 110.

The sealing lips illustrated in FIG. 9C are smaller than the ones shown in FIGS. 9A-B, as having two smaller sealing lips 165, 165' placed close to each other can increase the sealing effect without significantly increasing the force required to move the plug 150 within the valve house 110. However, the sealing lips 165 and sealing grooves 166 may have any dimensions within the scope of the invention regardless of whether they are placed in pairs or how they are distributed along the length of the body 130 of the valve house 110.

Figure 9D:
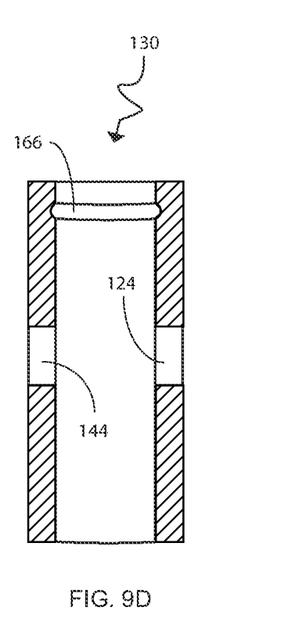

FIG. 9D shows the body 130 of the valve house 110 in cross-sectional view. The inside of the body 130 comprises a single sealing groove 166 placed near the top of said body 130. This example clarifies that the sealing groove 166 may be placed in the body 130 of the valve house 110. Then the sealing lip 165 will be placed correspondingly in the outside wall 160 of the plug 150 (not shown). As is the case for the sealing lips 165 illustrated in FIGS. 9A-C, the sealing groove 166 may be placed at any position along the length of the body 130 just as there may be any number of sealing grooves 166, 166', and they may vary in size.

All of the examples of FIG. 9 illustrate that there can be different variants and should not be seen as limiting. Both number of sealing lips 165 and sealing grooves 166, their placement, and their size may be varied further ranging from a single sealing lip 165 and sealing groove 166 to covering the full surface.

Figure 10A:
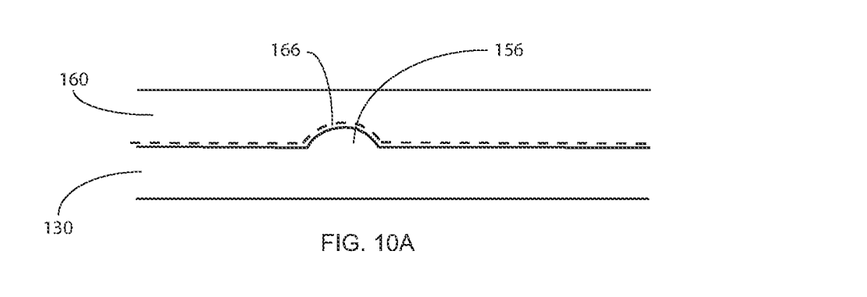
FIGS. 10A and 10B illustrate the sealing effect of the shrinkage of the cross valve material during cooling.
Figure 10B:
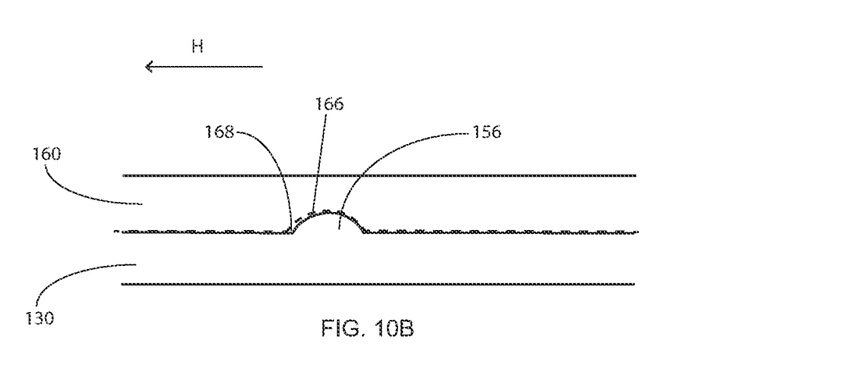

FIGS. 10A and 10B illustrate how the fact that the material of the cross valve 100 shrinks after injection molding can be used to increase the strength of the seal between an interlocking sealing lip 165 and a sealing groove 166. The two-component cross valve 100 is fabricated through a process of injection molding which takes place in two steps. One component is injection-molded first, and the second component is injection-molded subsequently while using said first component as a mold. Both components will experience shrinking when the material cools down. The majority of this shrinkage will take place immediately after injection molding, so the first component will be close to or will have reached its final geometry by the time it is used as a mold for the second component.

In the case, where the valve house 110 is injection-molded first, it will have shrunk the majority of the full shrinkage by the time it is used as a mold for the plug 150. In the illustrated example, the body 130 of the valve house 110 comprises a sealing lip 165. The plug 150 is molded inside the body 130 and will be injection-molded with a corresponding sealing groove 166. The side of the wall of the plug 130 facing the body 130 is shown dashed to distinguish the two lines on the sketch more easily. A slight distance is shown between the valve house 110 and the plug 150 to allow them to be visually distinguished. In the actual two-component cross valve 100, this clearance is minimized.

Once the plug 150 has been molded inside the valve house 110, it will shrink. If no measures are taken to control the shrinkage, it will happen in the direction towards the center of the structure (illustrated by the arrow H). When this shrinkage takes place, the sealing groove 166 will shift slightly in the direction of shrinkage (arrow H). This shift will cause a slight hollow 168 to form on one side of the sealing lip 165. Simultaneously, any clearance on the other side of the sealing lip 165 will diminish as the shrinkage pulls the inside of the sealing groove 166 even closer to the side of the sealing lip 165.

Figure 11:
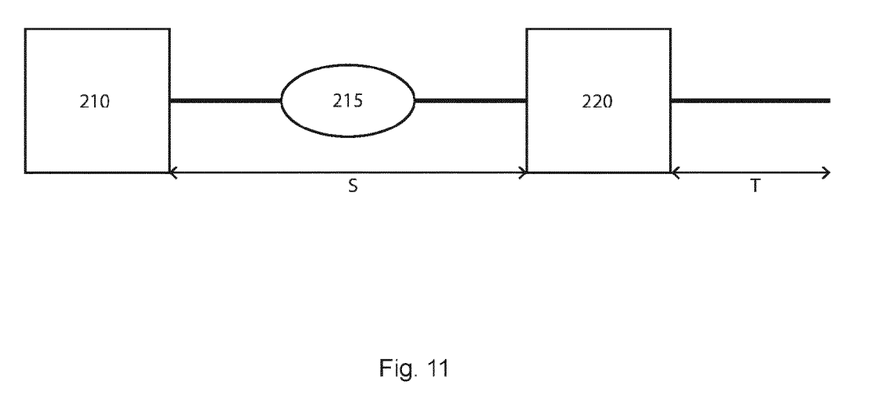
FIG. 11 is an illustration of the process flow of inner molding of the cross valve.

FIG. 11 illustrates the method of producing a two-component cross valve 100 (not shown). The process used is injection molding in two steps, where the valve house 110 is injection-molded first, and the plug 150 is injection-molded inside it using the house 110 as a mold, i.e., inner molding. The process is illustrated by a flowchart of the main steps involved.

In the first step 210 of the process, the valve house 110 is injection-molded. Then the valve house 110 may be repositioned 215, i.e., moved and/or reoriented, to be in a suitable position for the second step 220. The step of repositioning 215 may be foregone if the valve house 110 is in the desired position immediately after production. The second step 220 is the injection molding of the plug 150. The plug 150 is injection-molded directly inside the valve house 110 which thus functions as a mold for the plug 150.

Between the first step 210 and the second step 220, some time (illustrated by the arrow S) passes. During this time, the valve house 110 cools down after having been injection-molded, and during this cooling process said valve house 110 will undergo shrinking. The majority of the shrinking happens immediately after molding, but it may continue to shrink at a lower rate after the time period (S) has ended. The potential repositioning 215 of the valve house 110 takes place within the time period (S).

After the second step 220, where the plug 150 is injection-molded, there is another time period (illustrated by the arrow T), wherein the plug 150 cools off and where shrinking of said plug 150 takes place. Once cooling of the injection-molded material of the plug 150 has ended, the production is finished, and there are no further steps of assembly or post-processing of the cross valve 100. Both components of the two-component cross valve may continue to shrink after the illustrated steps of production.

Note that the lengths of the arrows T and S denominating the time periods are not representative of the length of said time periods.

Figure 12:
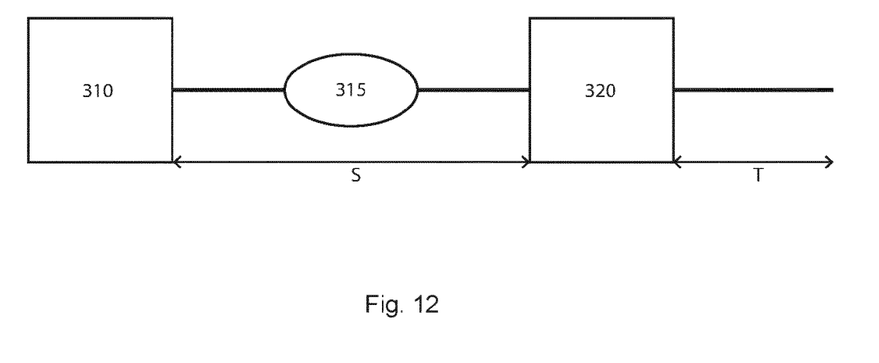
FIG. 12 is an illustration of the process flow of outer molding of the cross valve.

FIG. 12 illustrates the method of producing a two-component cross valve 100 (not shown). The process used is injection molding in two steps, where the plug 150 is injection-molded first and the valve house 100 is injection-molded around it using the plug 150 as a mold, i.e., inner molding, i.e., over molding. The process is illustrated by a flowchart of the main steps involved.

In the first step 310 of the process, the plug 150 is injection-molded. Then the plug 150 may be repositioned 315, i.e., moved and/or reoriented, to be in a suitable position for the second step 320. The step of repositioning 315 may be foregone if the plug 150 is in the desired position immediately after production. The second step 320 is the injection molding of the valve house 110. The valve house 110 is injection-molded directly around the plug 150 which thus functions as a mold for the valve house 110.

Between the first step 310 and the second step 320, some time (illustrated by the arrow S) passes. In this time, the plug 150 cools down after having been injection-molded, and during this cooling process said plug 150 will undergo shrinking. The majority of the shrinking happens immediately after molding, but it may continue to shrink at a lower rate after the time period (S) has ended. The potential repositioning 315 of the plug 150 takes place within the time period (S).

After the second step 320, where the valve house 110 is injection-molded, there is another time period (illustrated by the arrow T), wherein the valve plug 150 cools off, and where shrinking of said plug 150 takes place. Once cooling of the injection-molded material of the valve house 110 has ended, the production is finished, and there are no further steps of assembly or post-processing of the cross valve 100. Both components of the two-component cross valve may continue to shrink after the illustrated steps of production.

Note that the lengths of the arrows T and S denominating the time periods are not representative of the length of said time periods.

What is claimed is:

1. A two-component cross valve for controlling fluid flow through the cross valve, the cross valve comprising:
    a valve house, the valve house comprising a fluid inlet, a body, and a fluid outlet, the valve house being diecast from a first material, and the valve house being a single article; and
    a plug, the plug comprising a wall and an opening channel extending through the plug, the plug being diecast from a second material, and the plug being a single article,
    wherein the valve house is one of a first or a second component of the two-component cross valve and the plug is the other one of the first or the second component of the two-component cross valve, the first component having been injection molded directly contacting the second component and the final two-component cross valve, the two-component cross valve having only the first material and the second material,
    wherein the plug is placed inside the body of the valve house,
    wherein the plug is coaxially displaceable in the valve house,
    wherein the cross valve can be opened or closed to fluid flow,
    wherein the cross valve comprises at least one seal configured to seal the cross valve when open to fluid flow, and
    wherein the at least one seal comprises variations in a transverse sectional area of the plug along a length of the plug.

2. The cross valve according to claim 1, wherein the variations in the transverse sectional area of the plug are increases in the transverse sectional area, and wherein the plug comprises one or more sealing grooves.

3. The cross valve according to claim 1, wherein the variations in the transverse sectional area of the plug are decreases in the transverse sectional area, and wherein the plug comprises one or more sealing lips.

4. The cross valve according to claim 1, wherein the valve house and the plug further comprise interlocking sealing lips and sealing grooves.

5. The cross valve according to claim 1, wherein the variations in the transverse sectional area are one or more continuous increases along a longitudinal direction of a section of the plug in addition to any area changes brought on by the at least one seal, and wherein the cross valve comprises one or more conical sections.

6. The cross valve according to claim 1, wherein the transverse sectional area of the plug is oval.

7. The cross valve according to claim 1, wherein the plug comprises two flanges placed on either side of the body of the valve house.

8. A method for creating the cross valve according to claim 1, comprising:
injection molding the first component followed by injection molding the second component as either an inner molding or over molding, wherein the first component takes part in shaping the second component;
shrinking the first and second components during a cooling of the materials after molding to improve the seal of the cross valve as the second component is molded so that at least a part of the first component restricts a direction of the shrinking of the second component;
wherein no assembly of the cross valve is performed after molding of the cross valve.

9. The method for creating the cross valve according to claim 8, wherein the first component to be injection-molded is the valve house, wherein the second component is the plug, and wherein the plug is injection-molded inside the valve house by inner molding using the valve house as a mold.

10. The method for creating the cross valve according to claim 8, wherein the first component to be injection-molded is the plug, wherein the second component is the valve house, and wherein the valve house is injection-molded around the plug by over molding.

11. The cross valve according to claim 2, wherein the valve house and the plug comprise interlocking sealing lips and sealing grooves.

12. The cross valve according to claim 3, wherein the valve house and the plug comprise interlocking sealing lips and sealing grooves.

13. The cross valve according to claim 2, wherein the variations in the transverse sectional area are one or more continuous increases along a longitudinal direction of a section of the plug in addition to any area changes brought on by sealing lips or sealing grooves, and wherein the cross valve comprises one or more conical sections.

14. The cross valve according to claim 3, wherein the variations in the transverse sectional area are one or more continuous increases along a longitudinal direction of a section of the plug in addition to any area changes brought on by sealing lips or sealing grooves, and wherein the cross valve comprises one or more conical sections.

15. The cross valve according to claim 4, wherein the variations in the transverse sectional area are one or more continuous increases along a longitudinal direction of a section of the plug in addition to any area changes brought on by the sealing lips or the sealing grooves, and wherein the cross valve comprises one or more conical sections.

16. The cross valve according to claim 2, wherein the plug has an oval transverse sectional geometry.

17. The cross valve according to claim 3, wherein the plug has an oval transverse sectional geometry.

18. The cross valve according to claim 4, wherein the plug has an oval transverse sectional geometry.

19. The cross valve according to claim 2, wherein the plug comprises two flanges placed on either side of the body of the valve house.

20. The cross valve according to claim 3, wherein the plug comprises two flanges placed on either side of the body of the valve house.

* * * * *